(12) United States Patent
Nomura

(10) Patent No.: US 8,989,765 B2
(45) Date of Patent: Mar. 24, 2015

(54) SYSTEM AND TERMINAL

(75) Inventor: Takashi Nomura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 803 days.

(21) Appl. No.: 12/677,048

(22) PCT Filed: Mar. 25, 2009

(86) PCT No.: PCT/JP2009/055946
§ 371 (c)(1),
(2), (4) Date: Mar. 8, 2010

(87) PCT Pub. No.: WO2009/119661
PCT Pub. Date: Oct. 1, 2009

(65) Prior Publication Data
US 2011/0009128 A1      Jan. 13, 2011

(30) Foreign Application Priority Data

Mar. 27, 2008   (JP) ................................ 2008-083459

(51) Int. Cl.
*H04W 24/00* (2009.01)
*H04M 1/725* (2006.01)
*H04M 3/42* (2006.01)

(52) U.S. Cl.
CPC ........ *H04M 1/72572* (2013.01); *H04M 1/7253* (2013.01); *H04M 3/42365* (2013.01)
USPC ...................................... 455/456.1; 455/423

(58) Field of Classification Search
USPC ............. 455/456.1, 567, 550.1, 456.2, 456.3, 455/456.4, 456.5
See application file for complete search history.

(56) References Cited

U.S. PATENT DOCUMENTS

| 2003/0224803 | A1 | 12/2003 | Konno | |
|---|---|---|---|---|
| 2004/0214565 | A1* | 10/2004 | Shinmei | 455/423 |
| 2005/0048989 | A1* | 3/2005 | Jung | 455/456.1 |
| 2005/0064913 | A1* | 3/2005 | Kim | 455/567 |
| 2008/0032667 | A1* | 2/2008 | Yamane | 455/407 |
| 2009/0047944 | A1* | 2/2009 | Johnson et al. | 455/424 |

FOREIGN PATENT DOCUMENTS

| JP | 2000-215374 A | 8/2000 |
|---|---|---|
| JP | 2002-209262 A | 7/2002 |
| JP | 2003-61153 A | 2/2003 |

(Continued)

*Primary Examiner* — Myron K Wyche
(74) *Attorney, Agent, or Firm* — Birch, Stewart, Kolasch & Birch, LLP

(57) ABSTRACT

A terminal 104 that can appropriately control an operation mode of the terminal regardless of presence/absence of a user operation includes: a storage 206 storing a mode identifier for identifying a manner mode or a normal mode; a communication device 210; a position obtaining device 208 obtaining a current position; an input device 204 allowing the user to designate the operation mode; and a control unit 200 for transmitting a mode change instruction including the current position and the mode identifier through the communication device 210, when the operation mode is designated. The terminal 104 further includes: a sound output device 214; and a processing unit, responsive to reception of a mode change instruction from other terminal, for determining whether the mode identifier included in the mode change instruction is to be stored in the storage 206, in accordance with a distance between the current position obtained by position obtaining device 208 and the current position included in the mode change instruction.

10 Claims, 8 Drawing Sheets

(56) References Cited

FOREIGN PATENT DOCUMENTS

| JP | 2004-198245 A | 7/2004 |
|----|---------------|--------|
| JP | 2005-57711 A | 3/2005 |
| JP | 2006-5705 A | 1/2006 |
| JP | 2007-28158 A | 2/2007 |
| JP | 2007-88943 A | 4/2007 |
| JP | 2007-221615 A | 8/2007 |
| WO | WO-2004/107789 A1 | 12/2004 |

* cited by examiner

| TRANSMISSION SOURCE ADDRESS | usr1@xxx.xx.xx |
|---|---|
| TRANSMISSION DESTINATION ADDRESS | serverxx@zzz.zz.zz |
| BODY | <ModeChange><br>GRID = 0001<br>SPX = E135° 4851<br>SPY = N34° 3834<br>SHIGH = 100<br>MANNER = ON |

(B)

| TRANSMISSION SOURCE ADDRESS | serverxx@zzz.zz.zz |
|---|---|
| TRANSMISSION DESTINATION ADDRESS | usr2@xxx.xx.xx |
| BODY | <ModeChange><br>GRID = 0001<br>SPX = E135° 4851<br>SPY = N34° 3834<br>SHIGH = 100<br>MANNER = ON |

(C)

| TRANSMISSION SOURCE ADDRESS | serverxx@zzz.zz.zz |
|---|---|
| TRANSMISSION DESTINATION ADDRESS | usr3@xxx.xx.xx |
| BODY | <ModeChange><br>GRID = 0001<br>SPX = E135° 4851<br>SPY = N34° 3834<br>SHIGH = 100<br>MANNER = ON |

SYSTEM AND TERMINAL

TECHNICAL FIELD

The present invention relates to a system including a terminal operable in a plurality of operation modes and, more specifically, to a system for controlling the operation modes of the terminal, as well as to the terminal used in the system.

BACKGROUND ART

As portable telephones come to be used widely, ringtones of portable telephones suddenly ring at a place crowded with many people, for example, in a train or a movie theater, come to be a problem. For people other than the user of the portable telephone, such a ringtone may be annoying.

In order to disable ringtone upon reception of an incoming call, generally, a user manually sets the portable telephone to a manner mode. Techniques for automatically setting the manner mode rather than the manual operation by the user have also been developed.

In the portable telephone described in Patent Document 1, speed of moving of a user holding the portable telephone is estimated based on a time of movement between radio zones of base stations, and based on the result of estimation, whether the user is on a train or not is determined. If it is determined that the user is on a train, the portable telephone is automatically set to a manner mode. If it is determined that the user is not on a train, manner mode is automatically cancelled.

The technique described in Patent Document 2 allows detailed setting of operation modes. By way of example, the following setting is possible. A user puts an RFID (Radio Frequency IDentification) tag in his/her breast pocket. A portable radio terminal detects relative distance and speed between the tag and the portable radio terminal itself, and determines whether the portable radio terminal is taken out from the breast pocket or kept in the pocket. Depending on the result of determination, the terminal is set to a manner mode or the manner mode is cancelled.

According to Patent Document 3, in response to an incoming call from a terminal through a base station, a mobile communication terminal transmits a near field communication signal to other terminals in the near field, and counts the number of responses to the sent communication signal from the other terminals. Based on the number of responses, the mobile communication terminal estimates how many people are in the vicinity thereof. If the number of responses exceeds a prescribed threshold value, the mobile communication terminal notifies the user of the incoming call in the manner mode, and other wise notifies by a ringtone.

Patent Document 1: Japanese Patent Laying-Open No. 2003-61153
Patent Document 2: WO04/107789
Patent Document 3: Japanese Patent Laying-Open No. 2007-221615

DISCLOSURE OF THE INVENTION

Problems to be Solved by the Invention

The techniques for automatically changing modes described in Patent Documents 1 to 3 are available not in all settings, and effective only when specific conditions are met.

For example, the technique of Patent Document 1 is effective if the possessor is on a moving vehicle such as a train, while it is ineffective if he/she is in a stationary facility such as a movie theater. According to the technique of Patent Document 2, the manner mode is set only when the portable radio terminal is put in a pocket and the sound-generating mode is set when it is taken out of the pocket. If the user happens to hold the radio terminal in his/her hand or puts the terminal in his/her bag by some reason, ringtone will ring without regard to the surrounding environment, possibly annoying people nearby.

The technique described in Patent Document 3 requires presence of many portable telephones in the vicinity as a precondition. The ringtone should be turned off in some situations, even if there is not so many portable phones therearound, and the technique is ineffective in such situations. By way of example, assume that the user is interviewing an expectant in an office of a company, or in business negotiation with a client in a meeting room. Even if there is only a few people around the user, the telephone should be set to the manner mode. The technique according to Patent Document 3 is ineffective in such situations.

From these reasons, mode change is eventually made by the user's manual operation that much depends on the common sense, good manners and morals of the user.

It is often the case recently, however, that a thoughtless or ill-mannered person, or a person of low moral consciousness does not set his/her portable phone to the manner mode in a public space such as in a bus or on a train, annoying people with laud ringtone of the portable phone.

It is noted that portable telephones come to be used by users of all ages, including not only adults but children, as well as the elderly. Many parents give their children in the lower grades of elementary school for security concerns on the way to and from school, particularly when the children travel to school away from home by bus or train.

From the viewpoint of parents who give portable telephones to their children, it may be better not to teach the children how to set the manner mode. If the portable telephone is set to the manner mode and the child should fail to notice an incoming call that is notified by vibration of the portable telephone, the parent would be panicked thinking his/her child, not answering the call, could be in an accident. On the other hand, it is often the case that a portable telephone possessed by a child rings ringtone in a bus or train, since the child does not know how to set the manner mode.

A situation that a portable telephone rings where it should be set in the manner mode occurs not only when a child cannot set the manner mode by himself/herself but also when a parent is nearby. An adult may not forget to set his/her own portable telephone to the manner mode, while he/she often forgets to set the portable telephone of his/her child to the manner mode. It is possible, while enjoying a train ride on a holiday, that a portable telephone of a child may suddenly ring. Then the parent must hurriedly set the telephone to the manner mode.

A technique for appropriately setting the operation mode of a portable telephone even when the user does not know how to set the portable telephone to the manner mode or if he/she happens to forget to set the manner mode as described above, has been desired. Such a technique, however, is not provided to date.

This problem is not limited to the portable telephones. The problem is common to all portable type information terminals having the communication function that must notify the user of an occurrence of any event.

Therefore, an object of the present invention is to provide a system that can appropriately control operation modes of a terminal regardless of presence/absence of any user operation, according to the situation, as well as to provide a communication terminal therefor.

Means for Solving the Problems

According to a first aspect, the present invention provides a system including first and second terminals. The first terminal includes an output device, storage means for storing a mode identifier designating any of a plurality of operation modes in which output levels of the output device differs, a communication device, position obtaining means for obtaining a current position of the first terminal, designating means for allowing a user to designate any of the plurality of operation modes, and transmission means responsive to designation of any of the plurality of operation modes by the designating means, for transmitting, through the communication device, a mode change instruction including the current position of the first terminal obtained by the position obtaining means and a mode identifier indicating the operation mode designated by the designating means. The second terminal includes an output device, storage means for storing a mode identifier designating any of a plurality of operation modes in which output levels of the output device of the second terminal differs, a communication device, position obtaining means for obtaining a current position of the second terminal, and means, responsive to the communication device of the second terminal receiving the mode change instruction from other terminal, for determining whether or not the mode identifier included in the received mode change instruction is to be stored in the storage means, in accordance with a distance between the current position of the second terminal obtained by the position obtaining means of the second terminal and the current position included in the received mode change instruction.

The designating means of the first terminal allows the user to designate any of the plurality of operation modes. The transmitting means of the first terminal transmits, through the communication device, a mode change instruction including a mode identifier indicating the designated operation mode and the current position of the first terminal. Receiving the mode change instruction from another terminal, the second terminal determines whether or not the identifier included in the received mode change instruction is to be stored in the storage means of the second terminal, in accordance with the distance between the current position included in the received mode change instruction and the current position of the second terminal.

If the user holding the first terminal is near the user holding the second terminal and if the user of the first terminal designates an appropriate operation mode for his/her terminal, the second terminal comes to operate in the designated mode. Therefore, even if the user of the second terminal inadvertently forgets to set to the appropriate operation mode, both the first and second terminals are set to the operation mode appropriate for the surrounding situation, only if the user of the first terminal designates the appropriate operation mode. Further, whether or not the above-described operation should be performed in the second terminal is determined differently when the second terminal is located near the first terminal and when not. As a result, a system and a terminal that can appropriately control the operation mode of the terminal (second terminal) regardless of presence/absence of the user operation according to the situation can be provided.

According to a second aspect, the present invention provides a terminal, including: an output device; storage means for storing a mode identifier designating any of a plurality of operation modes in which output levels of the output device differs; and a communication device. The terminal additionally includes: position obtaining means for obtaining a position of the terminal; designating means for allowing a user to designate any of the plurality of operation modes, and causing the storage means to store a mode identifier corresponding to the operation mode; and transmission means, responsive to designation of any of the plurality of operation modes by the designating means, for transmitting a mode change instruction including the current position of the terminal obtained by the position obtaining means and an identifier indicating the operation mode designated by the designating means, through the communication device.

Preferably, the position obtaining means includes latitude and longitude obtaining means for obtaining latitude and longitude at which the terminal is positioned. The transmission means includes latitude and longitude transmission means, responsive to designation of any of the plurality of operation modes by the designating means, for transmitting a mode change instruction including the latitude and longitude at which the terminal is currently positioned obtained by the latitude and longitude obtaining means and an identifier indicating the operation mode designated by the designating means, through the communication device to the other terminal.

More preferably, the latitude and longitude obtaining means includes means for obtaining latitude, longitude and altitude at which the terminal is positioned. The latitude and longitude transmission means includes means, responsive to designation of any of the plurality of operation modes by the designating means, for transmitting a mode change instruction including the latitude, longitude and altitude at which the terminal is currently positioned obtained by the obtaining means, through the communication device to the other terminal.

More preferably, the output device includes a sound output device for generating sound, and a vibration output device for vibrating the terminal.

More preferably, the plurality of operation modes include a sound output mode in which the sound output device is operated and a vibration mode in which the vibration output device is operated. The designating means includes a mode designating means for allowing the user to designate either the sound output mode or the vibration mode, and for storing a mode identifier corresponding to the designated operation mode in the storage means. The transmission means includes means, responsive to designation of either the sound output mode or the vibration mode by the mode designating means, for transmitting a mode change instruction including the current position of the terminal obtained by the position obtaining means and the mode identifier indicating the operation mode designated by the mode designating means, through the communication device to the other terminal.

According to a third aspect, the present invention provides a terminal, including: an output device; storage means for storing a mode identifier designating any of a plurality of operation modes in which output levels of the output device differs; and a communication device. The terminal further includes: position obtaining means for obtaining a current position of the terminal; and determining means, responsive to the communication device receiving a mode change instruction including a current position of other terminal and a mode identifier, for determining whether or not the current position of the terminal obtained by the position obtaining means and the mode identifier included in the received mode change instruction is to be stored in the storage means.

Preferably, the position obtaining means includes latitude and longitude obtaining means for obtaining latitude and longitude at which the terminal is positioned. The mode change instruction received by the communication device includes latitude and longitude at which the other terminal is positioned and a mode identifier corresponding to any of the plurality of operation modes. The determining means includes means, responsive to the communication device receiving the mode change instruction, for determining whether or not the mode identifier included in the mode change instruction is to be stored in the storage means, in accordance with a distance between current latitude and longitude of the terminal obtained by the latitude and longitude obtaining means and the latitude and longitude included in the mode change instruction.

More preferably, the latitude and longitude obtaining means includes means for obtaining latitude, longitude and altitude at which the terminal is positioned. The mode change instruction received by the communication device further includes altitude at which the other terminal is positioned. The determining means includes means, responsive to the communication device receiving the mode change instruction, for determining whether or not the mode identifier included in the mode change instruction is to be stored in the storage means, in accordance with a distance between current latitude, longitude and altitude of the terminal obtained by the obtaining means and the latitude, longitude and altitude included in the mode change instruction.

More preferably, the output device includes a sound output device for generating sound, and a vibration output device for vibrating the terminal.

More preferably, the plurality of operation modes include a sound output mode in which the sound output device is operated and a vibration mode in which the vibration output device is operated. The mode change instruction received by the communication device includes a position of the other terminal and a mode identifier corresponding to either the sound output mode or the vibration mode. The determining means includes means, responsive to the communication device receiving the mode change instruction, for determining whether or not the mode identifier included in the mode change instruction is to be stored in the storage means, in accordance with a distance between the current position of the terminal obtained by the position obtaining means and the position of the other terminal included in the mode change instruction.

More preferably, the determining means includes means, responsive to the communication device receiving a mode change instruction including a position of the other terminal and a mode identifier, for storing the mode identifier included in the mode change instruction in the storage means, when a distance between the current position of the terminal obtained by the position obtaining means and the position of the other terminal included in the mode change instruction is smaller than a prescribed value.

More preferably, the terminal further includes a calling device. The output device includes sound generating means, responsive to an incoming call to the calling device, for outputting a ringtone in different levels in accordance with the mode identifier stored in the storage means.

More preferably, the terminal further includes a calling device, and means, responsive to an incoming call to the calling device, for selectively operating the sound output device and the vibration output device, in accordance with the mode identifier stored in the storage means.

More preferably, the terminal further includes means, responsive to reception of electronic data from other device through the communication device, for selectively operating the sound output device and the vibration output device, in accordance with the mode identifier stored in the storage means.

Effects of the Invention

As described above, according to the present invention, assuming that two terminals are communicable to each other and the user holding one terminal is near the user holding the other terminal, when the user of one terminal designates an appropriate operation mode of his/her own terminal, the other terminal comes to operate in the designated operation mode. Therefore, even if the user of the other terminal inadvertently forgets to set to the appropriate operation mode, the two terminals are both set to the appropriate operation mode according to the surrounding situation, only if the user of one terminal designates the appropriate operation mode. Further, whether or not the above-described operation should be performed in the other terminal is determined differently when the other terminal is located near the said one terminal and when not. As a result, a system and a terminal that can appropriately control the operation mode of the terminal (the other terminal) regardless of presence/absence of the user operation according to the situation can be provided.

BRIEF DESCRIPTION OF THE DRAWINGS

FIG. 5 shows a configuration of a group DB 256 shown in FIG. 1.

FIG. 6 shows configurations of a mode change requesting mail and a mode change instruction mail.

DESCRIPTION OF THE REFERENCE SIGNS

Figure 1:
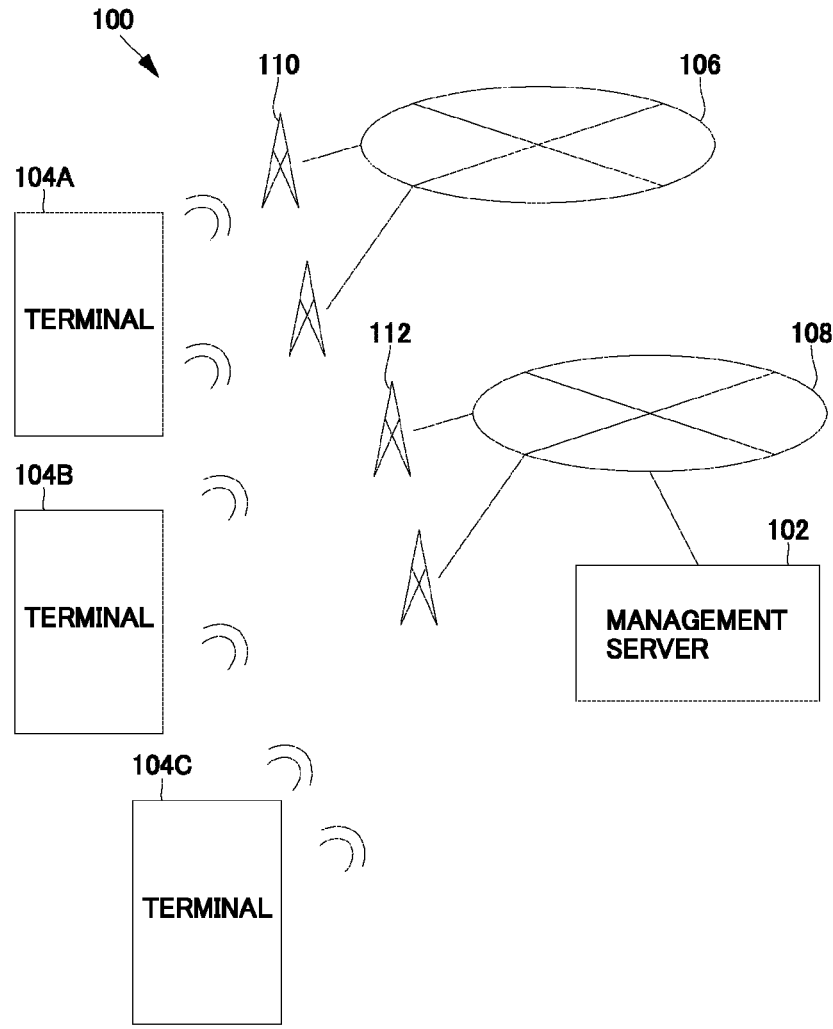
FIG. 1 shows a network environment of a system 100 in accordance with an embodiment of the present invention.

100 system, 102 management server, 104 (104A, 104B, 104C) terminal, 106 telephone line, 108 Internet, 110 first base station, 112 second base station, 200 control unit, 202 display device, 204 input device, 206 storage, 208 position obtaining device, 210 communication device, 212 vibration output device, 214 sound output device, 216 time counter, 218 sound input/output device, 220 calling device, 250 communication device, 252 control unit, 254 storage, 256 group DB.

BEST MODES FOR CARRYING OUT THE INVENTION

In the following, embodiments of the present invention will be described in detail with reference to the figures. In the following description of embodiments, the same components are denoted by the same reference characters. Their functions and names are also the same. Therefore, detailed description thereof will not be repeated.

[Network Environment]

FIG. 1 schematically shows a configuration of system 100 in accordance with an embodiment of the present invention. Referring to FIG. 1, system 100 includes a management server 102 connected to the Internet 108, for managing, in response to a request from a terminal connected to the Internet 108, data transmission/reception between the terminal and another terminal connected to the Internet 108. Details of management by management server 102 will be described later. System 100 further includes: a plurality of base stations such as first and second base stations 110 and 112; and terminals 104A, 104B, 104C and so on, each connectable through these base stations to a telephone line 106 and to the Internet 108, and having a communication function of transmitting/receiving data to/from other terminal connected to the Internet 108 and a calling function for making and receiving calls to/from other terminals connected to telephone line 106.

Terminals such as terminals 104A, 104B and 104C included in system 100 are classified into a number of groups, and each group has a group ID. In the following, such a terminal may also be simply represented by a terminal 104.

[Configuration of Terminal 104]

(Appearance of Terminal 104)

Figure 2:
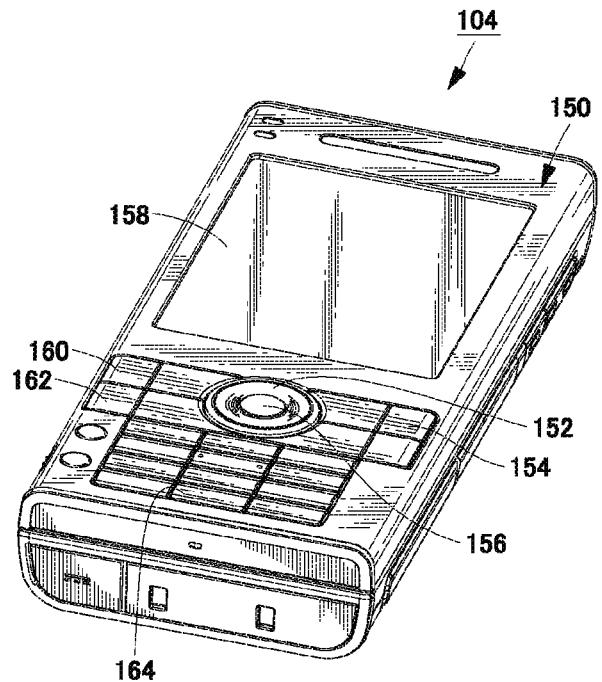
FIG. 2 shows an appearance of a terminal 104A shown in FIG. 1.

FIG. 2 is a perspective view showing the appearance of terminal 104. It is assumed that configurations of terminals 104A, 104B and 104C are all the same as terminal 104. Referring to FIG. 2, terminal 104 is a portable telephone, including: a housing 150 having a flat, rectangular parallelepiped shape; a display 158 arranged on an upper half of a top surface of housing 150; a cursor key 152 arranged directly below display 158, and operated to move a cursor displayed on display 158 upward/downward and to the right/left; an OK button 156 arranged inside cursor key 152; and a power button 154 arranged on the right side of cursor key 152 and operated to turn on/off the power.

Terminal 104 further includes: a manner mode button 160 arranged on the left side of cursor key 152, for manually switching between a manner mode in which generation of ringtone is disabled and terminal 104 is vibrated instead upon reception of an incoming call, to notify an incoming call, and a ringtone output mode in which ringtone rings upon reception of an incoming call; a call control button 162 arranged below manner mode button 160, and operated for starting or ending a call; and ten keys 164 arranged directly below cursor key 152, and operated for inputting characters and an access code such as a telephone number or a mail address.

(Functional Configuration of Terminal 104)

Figure 3:
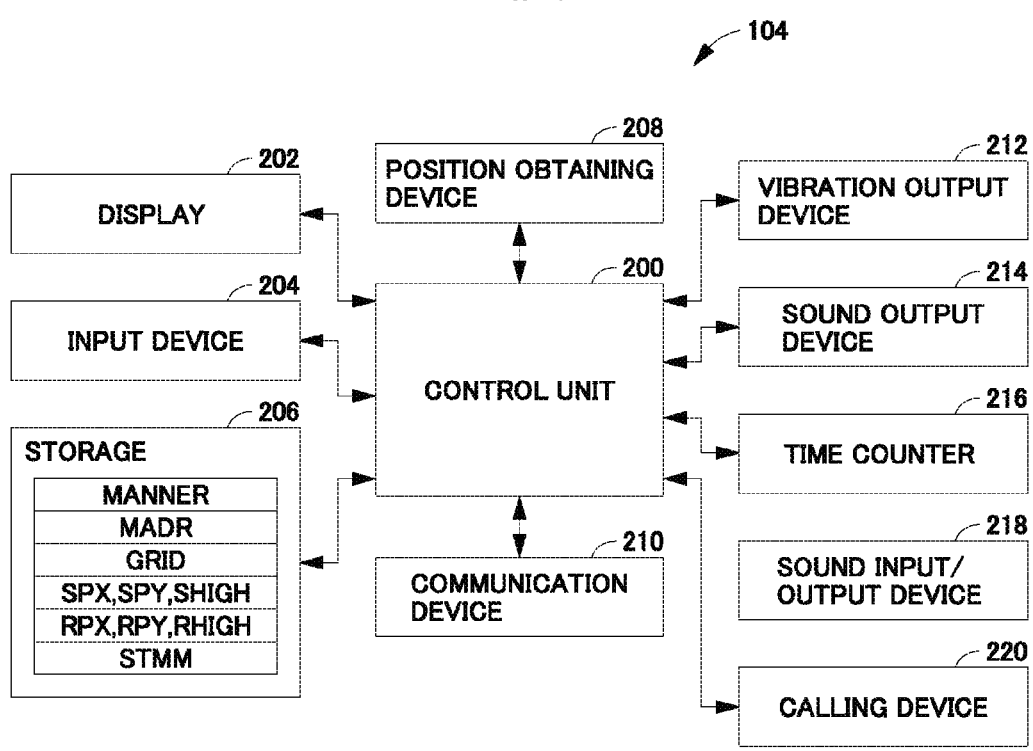
FIG. 3 is a block diagram of terminal 104A shown in FIG. 1.

FIG. 3 is a block diagram showing a functional configuration of terminal 104. Referring to FIG. 3, terminal 104 includes: a control unit 200 substantially formed of a computer, for central control of terminal 104; a calling device 220 connected to control unit 200, for enabling wireless voice communication with another terminal when a call to/from the said another terminal is made; a communication device 210 connected to control unit 200, for wireless data communication with another terminal or management server 102; an input device 204 connected to control unit 200; a time counter 216 counting date and time and outputting the count to control unit 200; a position obtaining device 208 obtaining the current position of terminal 104 by a GPS (Global Positioning System) in latitude and longitude and applying the result to control unit 200; a vibration output device 212 for vibrating terminal 104 in response to an instruction from control unit 200; a sound output device 214 for outputting sound such as the ringtone, in response to an instruction from control unit 200; a display device 202 displaying display data from control unit 200; and a storage 206 storing various pieces of information used by control unit 200 for controlling terminal 104.

Input device 204 includes cursor key 152, power button 154, OK button 156, manner mode button 160, call control button 162, ten keys 164 and the like shown in FIG. 2. Each of calling device 220 and communication device 210 includes an antenna, not shown, an RF (Radio Frequency) unit, a modulator unit and a demodulator unit. Display device 202 includes a display 158 shown in FIG. 2.

Terminal 104 further includes: a sound input/output device 218 connected to calling device 220, for receiving voice of the user of terminal 104 during a call, converting the voice to electric signals and applying the signals to calling device 220, and for receiving voice signals of a terminal of the other party through calling device 220 and converting the signals to voice. Sound input/output device 218 includes a microphone, a sound input data processing unit, a speaker, and a sound output data processing unit. Sound output device 214 includes a speaker different from the speaker included in sound input/output device 218.

Storage 206 includes an area for storing a variable MANNER storing a value indicating whether terminal 104 is in the manner mode or in the ringtone output mode, a variable MADR storing a mail address of terminal 104, and a variable GRID storing a group ID to which terminal 104 belongs. Storage 206 further includes an area for storing variables SPX, SPY and SHIGH storing latitude, longitude and altitude of the current position of another terminal extracted from a mode change instruction mail received from the said another terminal, variables RPX, RPY and RHIGH storing latitude, longitude and altitude of the current position of terminal 104, and a variable STMM storing a value indicating the operation mode to which the terminal 104 is to be set, extracted from the mode change instruction mail The value stored in variable STMM is common to the value stored in variable MANNER.

In variable MANNER, 0 or 1 is stored. If the value is 0, terminal 104 is in the ringtone output mode (manner mode OFF), and if the value is 1, terminal 104 is in the manner mode (manner mode ON).

[Functional Configuration of Management Server 102]

Figure 4:
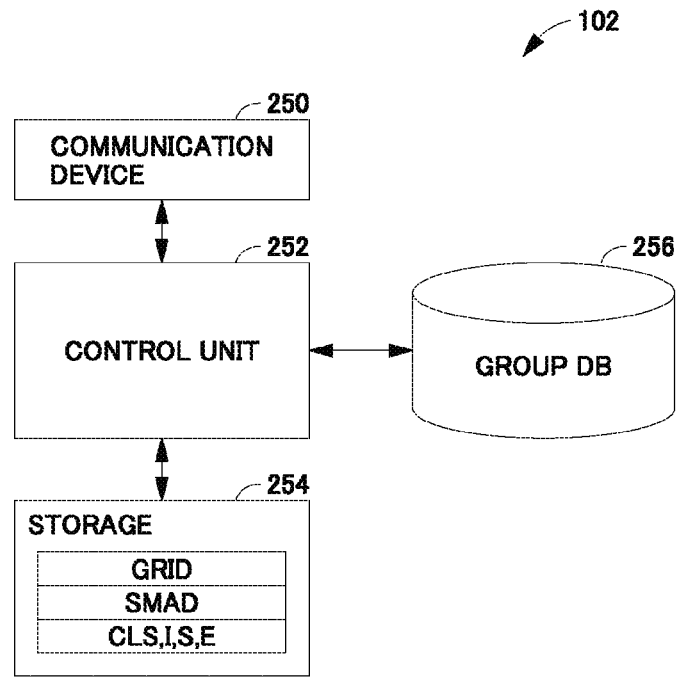
FIG. 4 is a block diagram of a management server 102 shown in FIG. 1.

FIG. 4 is a block diagram showing functional configuration of management server 102. Referring to FIG. 4, management server 102 includes a control unit 252 implemented substantially of a computer, for central control of management server 102, and a communication device 250 for wireless data communication with other terminals, a storage 254 for storing various pieces of information, and a group DB 256 managing pieces of information related to terminals included in system 100, all connected to control unit 252.

Storage 254 includes areas for storing a variable GRID storing a group ID of a terminal as an object of control temporarily when the terminal is controlled, a variable SMAD storing a mail address of a terminal that has transmitted a mode change instruction mail for controlling another terminal of the group as the object of control, and variables CLS, I, S and E used internally by a program realizing functions of management server 102.

In the following, the mail address of management server 102 is assumed to be "serverxx@zzz.zz.zz."

[Configuration of Group DB 256]

FIG. 5 shows a configuration of group DB 256 shown in FIG. 4. Referring to FIG. 5, in group DB 256, one record is allocated to one terminal. Each record of group DB 256 consists of: a group ID field storing the group ID of the group to which each terminal belongs; a user name field storing a user name of each terminal; a mail address field storing a mail address of each terminal; a class field storing a value 0, 1 or 2 indicating a class to which the terminal belongs when the terminals are classified into three classes according to "strength of authority in a group" as will be described later; and an index field storing an index of each record by an integer larger than 0.

Records in group DB 256 are always sorted in an ascending order of the group ID and class field values, and in the index field of each record, a serial number starting from 1 is allotted, from the first one.

(Strength of Authority in a Group)

The number (0, 1 or 2) stored in the class field indicates the strength of authority in mode change, within a group. A terminal having the value 0 is referred to as a class 0 terminal, the value 1 a class 1 terminal and the value 2, a class 2 terminal. The authority of each terminal is stronger as the class value is smaller The value is utilized in the following manner Assume that a user of a terminal belonging to a certain class of a certain group has set the operation mode of his/her terminal either to the manner mode or the ringtone output mode. Here, the operation mode of another terminal belonging to the same group as the said terminal and of the class of authority equal to or weaker than the said terminal is forced to the same operation mode as the said terminal. The change is executed by a communication for mode change between the terminals in the group through management server 102.

In group DB 256 shown in FIG. 5, group IDs of groups of terminals corresponding to user names User1 to User3, User4 to User6 and Userx to Userz are "0001," "0002" and "9999," respectively.

For instance, in the group having the group ID "0001," if the operation mode of the terminal having the user name User1 is changed, the operation mode of terminals of User2 and User3 are forced to the operation mode of the terminal of User1. If the operation mode of the terminal of User2 is changed, the operation mode of the terminal of User3 is forced to the operation mode of the terminal of User2. The operation mode of the terminal of User1 is not changed.

In the following, description will be given assuming that the user names of terminal 104A, 104B and 104C are User1, User2 and User3 shown in FIG. 5, respectively.

[Configuration of Mail Data]

When the operation mode of terminal 104 is changed, terminal 104 transmits an electronic mail referred to as a mode change request mail, to management server 102. When management server 102 receives the mode change request mail, management server 102 transmits a mode change instruction mail to all terminals belonging to the same group as the source terminal that has transmitted the mode change request mail and belonging to the class having the same or lower authority than the source terminal.

FIG. 6(A) shows a configuration of the mode change request mail transmitted by terminal 104A. Referring to FIG. 6(A), the mode change request mail includes a "transmission source address" storing the mail address of the terminal as the transmission source, a "transmission destination address" of the transmission destination, and a "body" describing the mail contents.

In the body, "<ModeChange>" is described as a mode change command on the first line, and on the second and the following lines, the group ID, latitude, longitude and altitude, and the value of variable MANNER of the terminal of the mail transmission source address are described, using "GRID=", "SPX=", "SPY=", "SHIGH=" and "MANNER=" as keywords, respectively.

In the mode change request mail shown in FIG. 6(A), as can be seen from the record of "User1" of the group DB shown in FIG. 5, the mail address "usr 1 @xxx.xx.xx" of terminal 104A is stored as the transmission source address. As the group ID in the body, the group ID "0001" to which terminal 104A belongs is described, and in SPX, SPY and SHIGH, values of latitude, longitude and altitude indicating the current position of terminal 104A are stored. In MANNER, the value "0" or "1" is described in accordance with the operation mode after change. Here, "0" indicates that the manner mode is OFF, and "1" indicates that the manner mode is ON. As the transmission destination address, "serverxx@zzz.zz.zz", which is the mail address of management server 102, is stored.

FIGS. 6(B) and 6(C) represent configurations of mode change instruction mails transmitted by management server 102 to terminals 104B and 104C, respectively, in response to the mode change request mail shown in FIG. 6(A) received by management server 102. Referring to FIGS. 6(B) and 6(C), the mode change instruction mail consists of a "transmission source address" storing the mail address of management server 102 as the transmission source of the mail, a "transmission destination address" storing a mail address or mail addresses of other terminal or terminals belonging to the same group as the terminal corresponding to the transmission source address of the mode change request mail and having the class field value not lower than the class field value of the terminal as the transmission source of the mode change request mail, and the "body," of which contents are the same as the body of mode change request mail.

As the transmission source address of the mode change instruction mail shown in FIG. 6(B), the address of management server 102 is stored, and as the transmission destination address, the mail address of terminal 104B having the value not lower than that of terminal 104A, is stored. In the body, the same contents as the body of mode change request mail shown in FIG. 6(A) are described. As can be seen from FIG. 5, terminal 104B has the same group ID "0001" as terminal 104A, and the class field value "1" larger than the value "0" of terminal 104A. Therefore, this mode change instruction mail is transmitted. The same applies to the mode change instruction mail shown in FIG. 6(C).

[Software Configuration]

(Software Configuration of Terminal 104A)

FIGS. 7 to 10 are flowcharts representing the control structure of a program executed by terminal 104A. The functions of terminal 104A are realized as the program is executed by control unit 200, which is substantially a computer.

Figure 7:
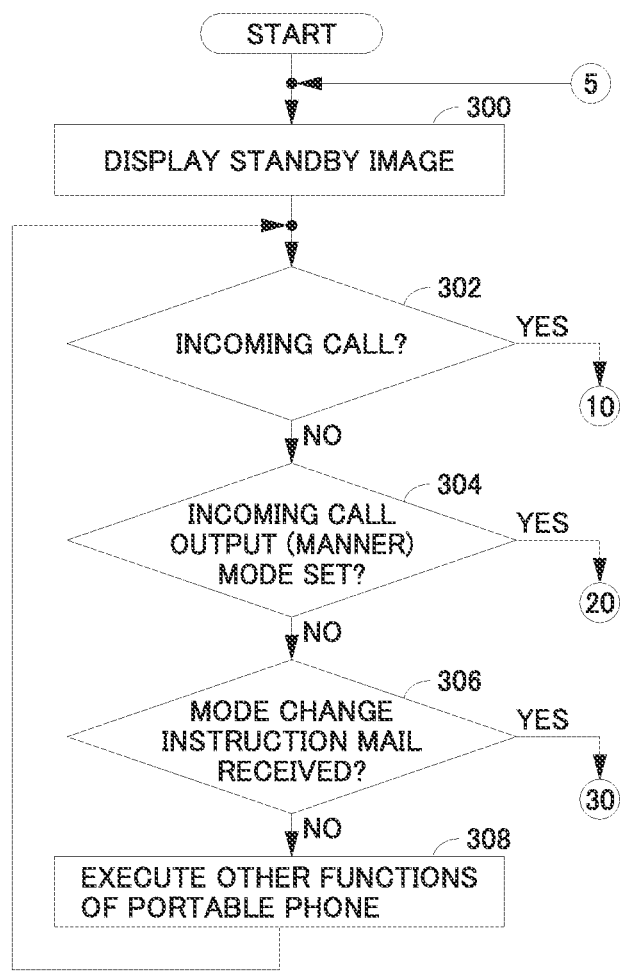
FIG. 7 is a flowchart representing a control structure of a computer program realizing the function of terminal 104A.

Referring to FIG. 7, the program includes: a step 300 started as the power of terminal 104A is turned on, of displaying a standby image on display 158; a step 302, following step 300, of determining whether there is any incoming call from other terminal, and branching control flow depending on the result of determination; a step 304, executed if the result of determination at step 302 is NO, of determining whether or not manner mode button 160 is pressed by the user, and branching control flow depending on the result of determination; a step 306, executed if the result of determination of step 304 is NO, of determining whether a mode change instruction mail has been received from management server 102, and branching control flow depending on the result of determination; and a step 308, executed if the result of determination at step 306 is NO, of executing other usual functions of the portable telephone and returning control to step 302. At step 308, if there is any instruction from the user, a process is done accordingly, and if there is no instruction, control is returned to step 302, and such operations are repeated.

Figure 8:
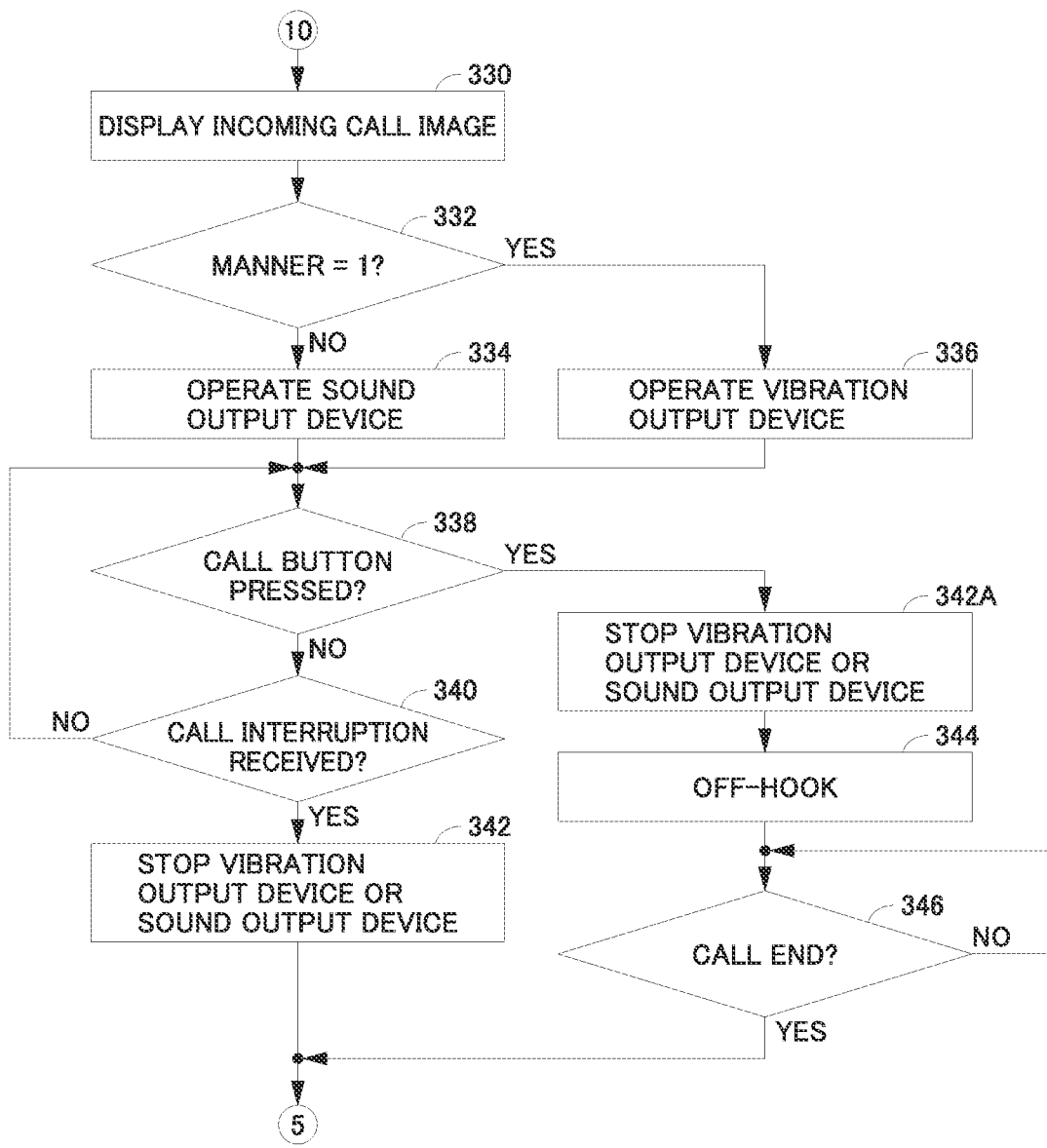
FIG. 8 is a flowchart representing a control structure of a computer program realizing the function of terminal 104A.

Referring to FIG. 8, the program further includes: a step 330, executed if the result of determination at step 302 shown in FIG. 7 is YES, of displaying an incoming call image on display 158 notifying the user of an incoming call; a step 332, following step 330, of determining whether or not the value of MANNER is 1, and branching control flow depending on the result of determination; a step 334, executed if the result of determination at step 332 is NO, of operating sound output device 214 and generating sound; and a step 336, executed if the result of determination at step 332 is YES, of operating vibration output device 212 and vibrating terminal 104A. Specifically, if the value of variable MANNER is 1, sound is not generated and the incoming call is notified by vibration, and if it is 0, the ringtone rings.

The program further includes: a step 338, following step 334 and step 336, of determining whether or not call control button 162 is pressed by the user, and branching control flow depending on the result of determination; a step 340, executed if the result of determination at step 338 is NO, of determining whether or not a call interruption signal indicating interruption of a call is received from other terminal, and branching control flow depending on the result of determination; and a step 342, executed if the result of determination at step 340 is YES, of stopping the operation of sound output device 214 or vibration output device 212 depending on whether the variable MANNER is 0 or 1, and returning the control to step 300 shown in FIG. 7. If the result of determination at step 340 is NO, control returns to step 338.

The program further includes: a step 342A, executed if the result of determination at step 338 is YES, of performing a process similar to that of step 342, and stopping the ringtone or vibration device; a step 344, following step 342A, of setting terminal 104A to an off-hook state, and a step 346, following step 344, of waiting until the user ends the call, and at the end of the call, returning control to step 300 shown in FIG. 7.

Figure 9:
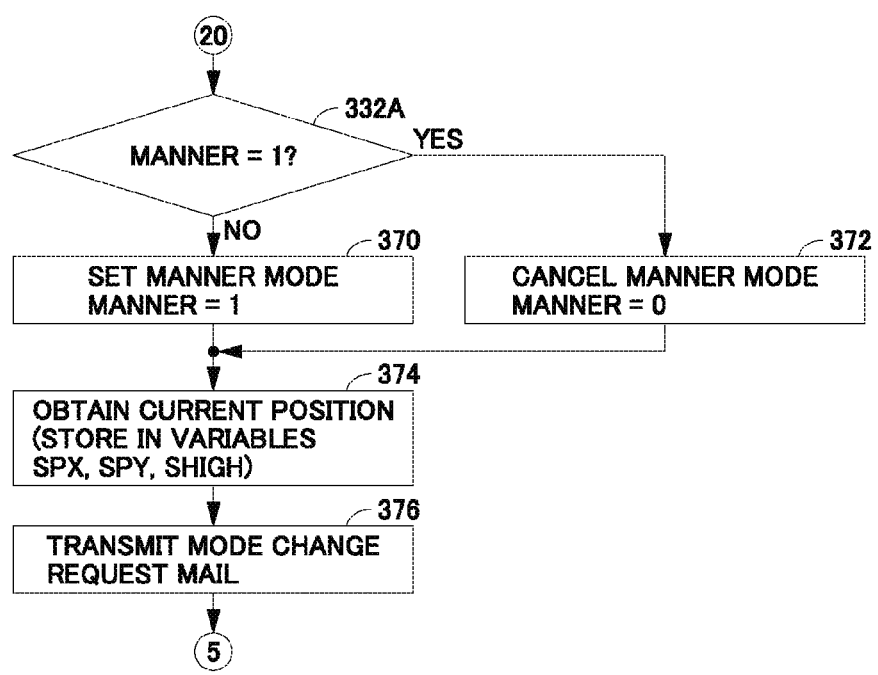
FIG. 9 is a flowchart representing a control structure of a computer program realizing the function of terminal 104A.

Referring to FIG. 9, the program further includes: a step 332A, executed if the result of determination at step 304 shown in FIG. 7 is YES, of determining whether or not the value of variable MANNER is 1, and branching control flow depending on the result of determination; a step 370, executed if the result of determination at step 332A is NO, of inputting 1 to variable MANNER; a step 372, executed if the result of determination at step 332A is YES, of inputting 0 to variable MANNER; a step 374, executed after step 370 and step 372, of obtaining latitude, longitude and altitude as the current position of terminal 104A from position obtaining device 208, and inputting to variables SPX, SPY and SHIGH, respectively; a step 376, following step 374, of inputting, to the transmission source address of the mode change request mail, the transmission destination address and the values corresponding to keywords "GRID", "SPX", "SPY", "SHIGH" and "MANNER" of the body, the value of variable MADR, the mail address of management server 102, and values of variables GRID, SPX, SPY, SHIGH and MANNER, respectively, to generate a mode change request mail, transmitting the generated mode change request mail to management server 102, and returning control to step 300 of FIG. 7.

Figure 10:
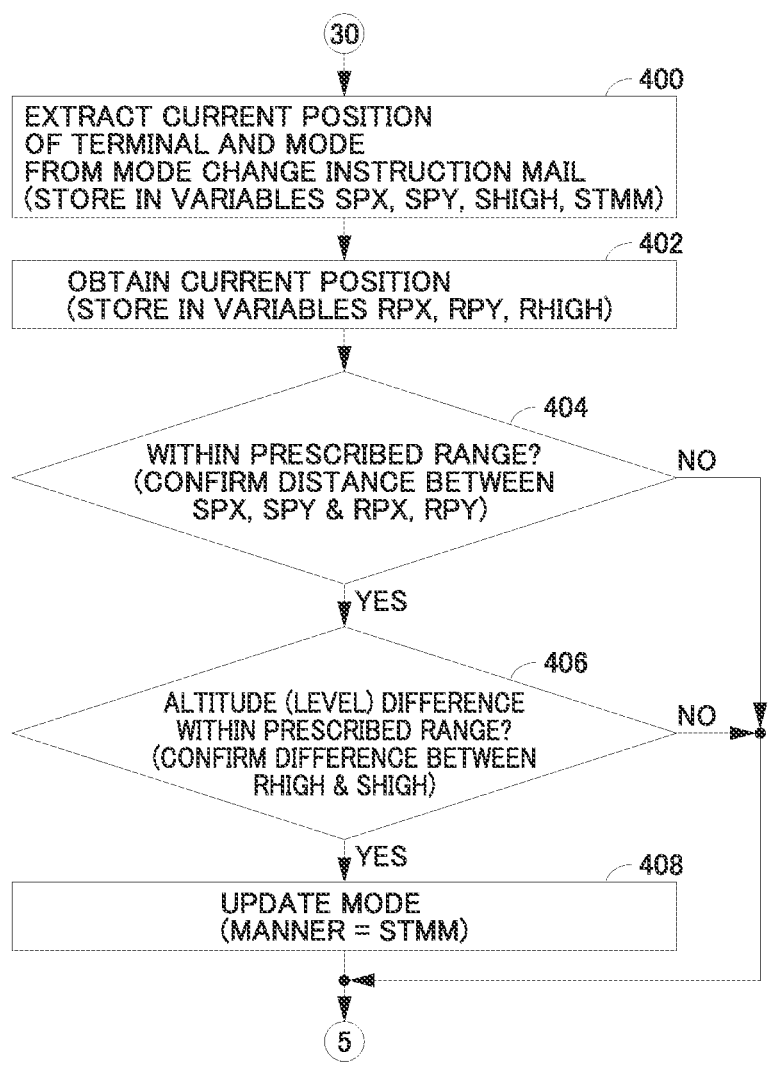
FIG. 10 is a flowchart representing a control structure of a computer program realizing the function of terminal 104A.

Referring to FIG. 10, the program further includes: a step 400, executed if the result of determination at step 306 shown in FIG. 7 is YES, of inputting the values indicated by keywords "SPX", "SPY", "SHIGH" and "MANNER" included in the body of mode change instruction mail to variables SPX, SPY, SHIGH and STMM, respectively; and a step 402, following step 400, of obtaining latitude, longitude and altitude as the current position of terminal 104A from position obtaining device 208, and inputting the obtained latitude, longitude and altitude to variables RPX, RPY and RHIGH, respectively.

The program further includes: a step 404, following step 402, of calculating a distance between the position specified by variables SPX and SPY and the position specified by variables RPX and RPY, determining whether or not the calculated distance is smaller than a prescribed distance, and branching control flow depending on the result of determination; a step 406, executed if the result of determination at step 404 is YES, of calculating a difference (level difference) between variables SHIGH and RHIGH, determining whether or not the calculated difference is smaller than a prescribed value, and branching control flow depending on the result of determination; a step 408, executed if the result of determination at step 406 is YES, of inputting the value of variable STMM to variable MANNER, and returning control to step 300 shown in FIG. 7. If the result of determination at step 404 is NO, and if the result of determination at step 406 is NO, the control returns to step 300 shown in FIG. 7.

In the present embodiment, the distance calculated at step 404 is Euclidean distance between two points on a plane. Further, in the present embodiment, the prescribed values as the threshold value used for the determinations at steps 404 and 406 are both 15 m.

(Software Configuration of Management Server 102)

Figure 11:
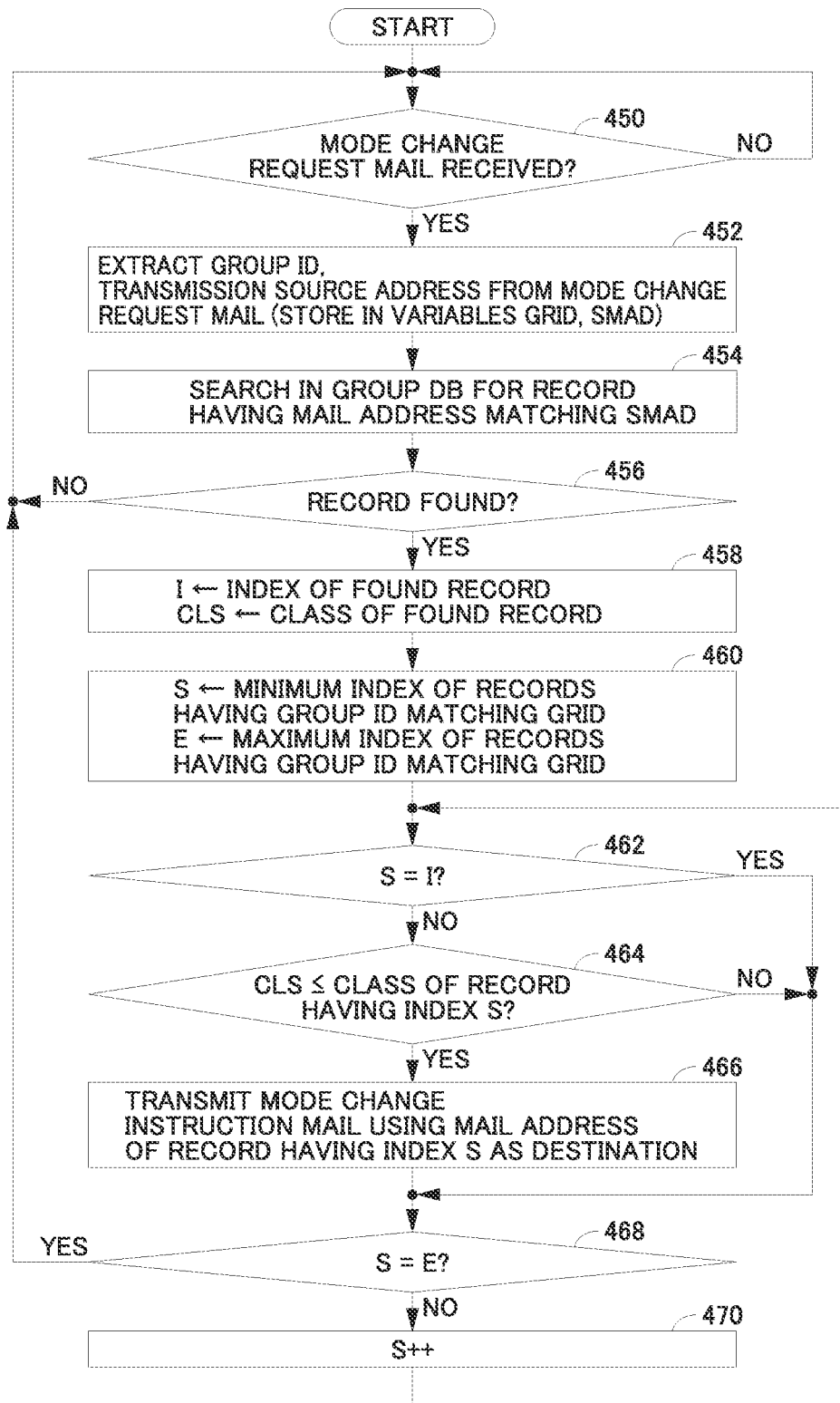
FIG. 11 is a flowchart representing a control structure of a computer program realizing the function of management server 102.

FIG. 11 is a flowchart representing a control structure of a program executed by management server 102. The functions of management server 102 are realized as the program is executed by control unit 252, which is substantially a computer.

Referring to FIG. 11, the program includes: a step 450 of waiting until a mode change request mail is received from any of the terminals under control; a step 452, executed upon reception of a mode change request mail, of inputting the transmission source address and the value indicated by the keyword "GRID" of the body of the received mode change request mail to variables SMAD and GRID, respectively; a step 454, following step 452, of searching, in group DB 256, for a record of which mail address field has the value matching variable SMAD; and a step 456, following step 454, of determining whether or not the searched record has been found at step 454, and branching control flow depending on the result of determination. If the result of determination at step 456 is NO, the control returns to step 450.

The program further includes: a step 458, executed if the result of determination at step 456 is YES, of inputting the values of index field and the class field of the searched out record to variables I and CLS, respectively; a step 460, following step 458, of inputting the minimum and maximum values of the index field of the records of which group ID field has the value matching variable GRID in group DB 256, to variables S and E, respectively; and a step 462, following step 460, of determining whether or not the value of variable S is the same as the value of variable I, and branching control flow depending on the result of determination.

The program further includes: a step 464, executed if the result of determination at step 462 is NO, of determining whether or not the value of class field of the record of which index matches the value of variable S, is larger than the value of variable CLS, and branching control flow depending on the result of determination; a step 466, executed if the result of determination at step 464 is YES, of generating an electronic mail of which transmission source address, transmission destination address and the body are the same as the mail address of management server 102, the mail address of the record whose index matches the value of variable S, and the body of the mode change request mail received at step 450, and transmitting the thus generated mode change instruction mail; a step 468, following step 466, of determining whether the value of variable S is equal to the value of variable E, and branching control flow depending on the result of determination; and a step 470, executed if the result of determination at step 468 is NO, of adding 1 to variable S, and returning control to step 462. If the result of determination at step 468 is YES, control returns to step 450. If the result of determination at step 462 is YES, and if the result of determination at step 464 is NO, control proceeds to step 468.

[Operation]

Referring to FIGS. 1 to 11, system 100 in accordance with the present embodiment having the structure above operates in the following manner. It is assumed that the pieces of information as shown in FIG. 5 are stored in advance in group DB 256.

By way of example, assume that User1 presses manner mode button 160 of terminal 104A. Depending on whether the value of variable MANNER at that time is 1 or 0, terminal 104A newly inputs 1 or 0 to variable MANNER (step 332A and 370 or 372 shown in FIG. 9). Specifically, the value of variable MANNER of terminal 104A toggles between 0 and 1. Terminal 104A obtains the current position, generates a mode change request mail, and transmits the mail to management server 102.

Receiving the mode change request mail, management server 102 extracts the mail address of the terminal as the transmission source of mode change request mail, and the group ID of the terminal (step 452 shown in FIG. 11). Management server 102 searches, in group DB 256, for a record having a mail address matching the extracted mail address (step 454 shown in FIG. 11). If such a record does not exist (step 456 shown in FIG. 11), control returns to step 450. In that case, though the mode change request mail is received by management server 102, no operation is made.

Considering the situation shown in FIG. 5, there is a record having the mail address of terminal 104A (the record of which user name is "User1" in FIG. 5), in group DB 256. Therefore, receiving the mode change request mail from terminal 104A, management server 102 searches for the corresponding record from group DB 256, and inputs 1 as the value of index field and 0 as the value of class field of the searched out record, to variables I and CLS, respectively (step 458 shown in FIG. 11). Management server 102 inputs 1 as the minimum index and 3 as the maximum index of the record of which group ID is "0001", to variables S and E, respectively (step 460 shown in FIG. 11).

For each of the records whose indexes have the value of variable S to variable E, management server 102 performs the following process (steps 462 to 470 shown in FIG. 11).

If the class field value of the record is not smaller than the value of variable CLS (class field value of terminal 104A), management server 102 generates a mode change instruction mail for the terminal corresponding to the record, and transmits the same. At this time, the body is the body of mode change request mail. If the record field value is smaller than the value of variable CLS, no operation is made.

Here, the records whose class field values are not smaller than the value of variable CLS (class field value of terminal 104A) are records of User2 and User3. Therefore, management server 102 transmits the mode change instruction mail to both terminals 104B and 104C.

On the other hand, receiving the mode change instruction mail (YES at step 306 shown in FIG. 7), the terminal as the transmission destination of the mode change instruction mail (for example, terminal 104B) inputs the latitude, longitude and altitude of terminal 104A obtained from the mode change instruction mail to variables SPX, SPY and SHIGH with reference to the mode change instruction mail, and inputs a value corresponding to the keyword "MANNER" (identifier indicating the current operation mode of terminal 104A) of the received mode change instruction mail to variable STMM (step 400 shown in FIG. 10). Terminal 104B obtains the latitude, longitude and altitude indicating the current position of terminal 104B from the position obtaining device of terminal 104B, and inputs the obtained latitude, longitude and altitude to variables RPX, RPY and RHIGH, respectively (step 402 shown in FIG. 10). Terminal 104C compares the variables SPX and SPY with variables RPX and RPY, to determine whether or not the distance exceeds 15 m. If the distance is larger than 15 m (NO at step 404 shown in FIG. 10), that is, if the distance between terminals 104A and 104B is larger than 15 m, terminal 104B returns control to step 300 shown in FIG. 7. That is, the operation mode of terminal 104B is not changed in this case.

If the distance between User2 and User1 is within 15 m in the horizontal direction but exceeding 15 m in the vertical direction, terminal 104B confirms whether or not the difference in altitude exceeds 15 m (NO at step 406 shown in FIG. 10). If the difference in altitude is larger than 15 m, control returns to step 300 shown in FIG. 7. Specifically, if terminals 104A and 104B are at positions within 15 m from each other in latitude and longitude but the difference in altitude exceeds 15 m, the operation mode of terminal 104B is not changed. If terminals 104A and 104B are at positions within 15 m from each other in latitude and longitude and the difference in altitude is within 15 m, the operation mode of terminal 104B is changed to the same operation mode as that of terminal 104A (step 408 of FIG. 10).

The operation of terminal 104B when it received the mode change instruction mail is as described above. The same operation is done in terminal 104C.

If there is an incoming call from other terminal to terminal 104B, the process shown in FIG. 8 is executed in terminal 104B. Specifically, an incoming call image is displayed on the display of terminal 104B (step 330 shown in FIG. 8). If the value of variable MANNER of terminal 104B is 0 (ringtone output mode, NO at step 332 shown in FIG. 8), terminal 104B rings the ringtone (step 334 shown in FIG. 8). If the value of variable MANNER is 1, terminal 104B does not generate the ringtone but generates vibration (step 336 shown in FIG. 8). The operation thereafter of terminal 104B is apparent from FIG. 8 and the description related to the configuration above and, therefore, details thereof will not be repeated.

Operations in terminals 104A and 104C are also the same.

Similar operation is done if the user of terminal 104B presses the manner button. It is noted, however, that the class of terminal 104B is 1 and, therefore, the mode change instruction mail is not transmitted to terminal 104A of class 0, and its operation mode is not changed. Terminal 104C is of the same class 1 as terminal 104B and, therefore, the mode change instruction mail is transmitted and its operation mode is changed to the same mode as terminal 104B.

The operation of the system in accordance with the present embodiment has been described. From the description above and the configuration described first, the system operation other than the above would be apparent to a person skilled in the art.

[Effects of the Present Embodiment]

As is apparent from the description above, utilizing system 100 in accordance with the present embodiment, if a user of a certain terminal sets the terminal to the manner mode, all terminals belonging to the same group as the terminal and having authority equal to or weaker than the said terminal are set to the manner mode. The same applies when the manner mode is cancelled.

Assume that users of all terminals belonging to a group are working together. Even if one of the users inadvertently fails to set the manner mode, if at least one user having a terminal of a prescribed authority sets his/her terminal to the manner mode, all terminals belonging to the same group having the same or lower authority are set to the manner mode. Therefore, a system can be provided that ensures sensible and good-mannered behavior of all the members of the group.

For instance, assume that a parent and a child hold terminals 104A and 104B of the above-described embodiment, respectively. When the parent and child spend time together at a discreet place where the terminals should be set to the manner mode as on a train or bus, and the child does not know how to set the manner mode, terminal 104B can automatically be set to the manner mode if the parent sets his/her terminal 104A to the manner mode. Thus, annoyance to other passengers can be avoided. Here, it is naturally understood that the authority of the parent's terminal is the same or higher than that of the child.

If terminals 104A and 104B are of the same authority, the following operation is possible. Assume that at a discreet place such as on a train or bus, the parent's hands are full of bags so that he/she cannot set his/her terminal 104A to the manner mode. In such a situation, if the child sets his/her terminal 104B to the manner mode, terminal 104A is also automatically set to the manner mode, and annoyance to other passengers can be avoided. The same applies when the manner mode is cancelled.

[Modifications]

In the embodiment above, communication terminal 104 is a portable telephone. The present invention, however, is not limited to such an embodiment, and the terminal may be a personal portable information terminal including PHS (Personal Handyphone System) and PDA (Personal Digital Assistant).

Further, in the embodiment above, when the operation mode of terminal 104 is changed by the user, an electronic mail is sent to management server 102. The present invention, however, is not limited to such an embodiment, and any protocol of transmission/reception may be used between terminal 104 and management server 102.

Further, in the embodiment above, the operation mode of terminal 104 includes only two modes, that is, the ringtone output mode and the manner mode. The present invention, however, is not limited to such an embodiment. In addition to these modes, the present invention may be applied when the terminal 104 operates in a radio-wave off mode in which radio transmission and reception to and from the outside is not permitted. The radio-wave off mode is effectively utilized, for example, at a hospital, where the radio wave emitted from a communication terminal may possibly have undesirable influence on equipment therearound. In such a case, the terminals are adapted such that when mode of terminal 104A is changed from the manner mode to the radio-wave off mode, terminals 104B and 104C are also set to the radio-wave off mode. Further, an LED (Light Emitting Diode) may be provided on terminal 104, and terminal 104 may be operated in a mode in which light is output from the LED when there is an incoming call from other terminal.

Further, in the embodiment above, terminal 104A operates in different manners depending on the value of variable MANNER, only when there is an incoming call from other terminal. The present invention, however, is not limited to such an embodiment. Terminal 104A may be adapted to operate in different manners depending on the value of variable MANNER when an ordinary electronic mail is received. Information terminals, including portable telephones, having an alarm function of outputting sound or vibration at a time point determined in advance by the user, have been known. Such a terminal may be adapted to operate in different manners depending on the value of variable MANNER when the time predetermined by the user arrives.

Further, in the embodiments above, a terminal 104 changes the operation mode of another terminal 104 through management server 102. The present invention, however, is not limited to such an embodiment. Each terminal may be adapted to store the mail addresses and class values of other terminals belonging to the same group. In that case, if the operation mode of one terminal is changed, the terminal may transmit the mode change instruction mail directly to all the terminals belonging to the same group. The program of such an operation is different from that of the embodiment above. What is necessary, however, is simply to cause each of the terminals to perform the mail transmission operation similar to that by management server 102 in the embodiment above, in place of transmitting one mail to the management server.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

Industrial Applicability

The present invention is applicable to the field related to communication equipment, including manufacturing, selling, or leasing of communication equipment to prevent breach of manners or providing facilities to prevent breach of manners.

The invention claimed is:

1. A system comprising first and second terminals, wherein said first terminal includes
an output device,
a storage unit that stores a mode identifier designating any of a plurality of operation modes in which output levels of said output device differs,
a communication device,
a position obtaining unit that obtains a current position of said first terminal,
a designating unit that allows a user to designate any of said plurality of operation modes, and
a transmission unit, responsive to designation of any of said plurality of operation modes by said designating unit, that transmits, through said communication device, a mode change instruction including the current position of said first terminal obtained by said position obtaining unit and a mode identifier indicating the operation mode designated by said designating unit; and
said second terminal includes
an output device,
a storage unit that stores a mode identifier designating any of a plurality of operation modes in which output levels of said output device of said second terminal differs,
a communication device,
a position obtaining unit that obtains a current position of said second terminal, and
a control unit responsive to said communication device of said second terminal receiving the mode change instruction from said first terminal, for determining that the mode identifier included in said received mode change instruction is to be stored, as a mode identifier designating an operation mode of said second terminal, in said storage unit of said second terminal, if a relative distance between the current position of said second terminal obtained by said position obtaining unit of said second terminal and the current position of said first terminal included in said received mode change instruction is smaller than a prescribed distance.

2. A terminal, comprising:

an output device;

a storage unit that stores a mode identifier designating any of a plurality of operation modes in which output levels of said output device differs; and a communication device; further comprising:

a position obtaining unit that obtains a current position of said terminal; and a determining unit, responsive to said communication device receiving a mode change instruction including a current position of a second terminal and a mode identifier, for determining that the mode identifier included in said mode change instruction is to be stored, as a mode identifier designating an operation mode of said terminal, in said storage unit, if a relative distance between the current position of said terminal obtained by said position obtaining unit and the current position of said second terminal included in said received mode change instruction is smaller than a prescribed distance.

3. The terminal according to claim 2, wherein said position obtaining unit includes latitude and longitude obtaining unit for obtaining latitude and longitude at which said terminal is positioned;

the mode change instruction received by said communication device includes latitude and longitude at which said second terminal is positioned and a mode identifier corresponding to any of said plurality of operation modes; and said determining unit includes determining subunit, responsive to said communication device receiving the mode change instruction, for determining that the mode identifier included in said mode change instruction is to be stored in said storage unit, if a relative distance between current latitude and longitude of said terminal obtained from said latitude and longitude obtaining unit and the latitude and longitude included in the mode change instruction is smaller than a prescribed distance.

4. The terminal according to claim 3, wherein said latitude and longitude obtaining unit includes an obtaining subunit for obtaining latitude, longitude and altitude at which said terminal is positioned;

the mode change instruction received by said communication device further includes altitude at which said second terminal is positioned; and said determining subunit includes a unit, responsive to said communication device receiving the mode change instruction, for determining whether or not the mode identifier included in said mode change instruction is to be stored in said storage unit, in accordance with a distance between current latitude, longitude and altitude of said terminal obtained by said obtaining subunit and the latitude, longitude and altitude included in the mode change instruction.

5. The terminal according to claim 2, wherein said output device includes a sound output device for generating sound, and a vibration output device for vibrating said terminal.

6. The terminal according to claim 5, wherein said plurality of operation modes include a sound output mode in which said sound output device is operated and a vibration mode in which said vibration output device is operated;

the mode change instruction received by said communication device includes a position of said second terminal and a mode identifier corresponding to either said sound output mode or said vibration mode; and said determining unit includes unit, responsive to said communication device receiving said mode change instruction, for determining that the mode identifier included in said mode change instruction is to be stored in said storage unit, if a relative distance between the current position of said terminal obtained by said position obtaining unit and the position of said second terminal included in said mode change instruction is smaller than a prescribed distance.

7. The terminal according to claim 2, wherein said determining unit includes unit, responsive to said communication device receiving a mode change instruction including a current position of said second terminal and a mode identifier, for storing the mode identifier included in the mode change instruction in said storage unit, when a relative distance between the current position of said terminal obtained by said position obtaining unit and the current position of said second terminal included in the mode change instruction is smaller than said prescribed distance.

8. The terminal according to any of claims 2 to 4 and 7, further comprising a calling device; wherein said output device includes sound generating unit, responsive to an incoming call to said calling device, for outputting a ringtone in different levels in accordance with the mode identifier stored in said storage unit.

9. The terminal according to any of claims 5 and 6, further comprising a calling device; and a control unit, responsive to an incoming call to said calling device, for selectively operating said sound output device and said vibration output device, in accordance with the mode identifier stored in said storage unit.

10. The terminal according to any of claims 5 and 6, further comprising a control unit, responsive to reception of electronic data from a second device through said communication device, for selectively operating said sound output device and said vibration output device, in accordance with the mode identifier stored in said storage unit.

* * * * *